(12) United States Patent
Barry et al.

(10) Patent No.: US 8,386,921 B2
(45) Date of Patent: Feb. 26, 2013

(54) SYSTEM AND METHOD FOR DEVELOPING A WEBSITE

(75) Inventors: David J. Barry, Pleasant Valley, NY (US); James S. Ferrara, Wappingers Falls, NY (US); Geoffrey L. Meissner, Southington, CT (US); Peter Reale, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 2056 days.

(21) Appl. No.: 10/087,679

(22) Filed: Mar. 1, 2002

(65) Prior Publication Data
US 2004/0205659 A1 Oct. 14, 2004

(51) Int. Cl.
*G06N 3/00* (2006.01)
(52) U.S. Cl. ...................................... 715/234
(58) Field of Classification Search .................. 707/10, 707/205, 511; 463/42; 715/560, 530, 513, 715/517, 511, 760, 523, 234, 243, 254, 255; 702/120; 709/224; 704/275; 705/26; 717/122; 382/113
See application file for complete search history.

(56) References Cited

U.S. PATENT DOCUMENTS

| | | | | |
|---|---|---|---|---|
| 5,712,979 A * | 1/1998 | Graber et al. | ................. | 709/224 |
| 5,787,445 A * | 7/1998 | Daberko | ..................... | 707/205 |
| 5,960,196 A * | 9/1999 | Carrier et al. | ................. | 717/122 |
| 6,009,398 A * | 12/1999 | Mueller et al. | ................. | 704/275 |
| 6,035,119 A | 3/2000 | Massena et al. | | |
| 6,076,733 A * | 6/2000 | Wilz et al. | ................. | 235/462.01 |
| 6,148,311 A | 11/2000 | Wishnie et al. | | |
| 6,185,587 B1 | 2/2001 | Bernardo et al. | | |
| 6,219,680 B1 | 4/2001 | Bernardo et al. | | |
| 6,247,032 B1 | 6/2001 | Bernardo et al. | | |
| 6,304,886 B1 | 10/2001 | Bernardo et al. | | |
| 6,308,188 B1 | 10/2001 | Bernardo et al. | | |
| 6,434,500 B1 * | 8/2002 | Boehne et al. | ................. | 702/120 |
| 6,486,892 B1 * | 11/2002 | Stern | ............................ | 715/760 |
| 6,643,652 B2 * | 11/2003 | Helgeson et al. | ................. | 707/10 |
| 6,656,050 B2 * | 12/2003 | Busch et al. | ..................... | 463/42 |
| 6,668,353 B1 * | 12/2003 | Yurkovic | ....................... | 715/205 |
| 6,724,918 B1 * | 4/2004 | Yen et al. | ........................ | 382/113 |
| 2001/0037258 A1 * | 11/2001 | Barritz | ............................ | 705/26 |
| 2002/0129056 A1 * | 9/2002 | Conant et al. | .................. | 707/511 |

OTHER PUBLICATIONS

Lemay, Laura. Laura Lemay's Teach Yourself Web Publishing with HTML 4 in 14 Days. 1997. Professional Reference Edition, Second Edition. pp. 96-97 and 402.*
Towers, J. Tarin. Visual Quickstart Guide: Dreamweaver 2 for Windows and Macintosh. 1999. p. 318.*
"Adobe GoLive 5.0 User Guide," 2000, Adobe Systems Incorporated, p. 1.*
"Adobe GoLive 5.0 User Guide," 2000, Adobe Systems Incorporated, pp. 82-94, 144-149, and 377-379.*
"Adobe GoLive 5.0 User Guide," 2000, Adobe Systems Incorporated, p. 94-98.*
Dietel, Deitel & Nieto, "*Internet & World Wide Web*", Prentice Hall, Upper Saddle River, NJ, 2000. ISBN 0-13-016143-8, Chapter 7, Introduction to Microsoft Visual InterDev 6, pp. 182-200.

* cited by examiner

*Primary Examiner* — Kyle Stork
(74) *Attorney, Agent, or Firm* — Matthew Chung; Hoffman Warnick LLC

(57) ABSTRACT

A system and method for developing a website are provided. Under the present invention, content can be provided in a non-HTML format. In addition, a the web pages of a website developed can each include categories. Each category can be assigned to a particular group of creators, which will submit content therefor.

29 Claims, 14 Drawing Sheets

NEWS
  SPORTS
    BASEBALL
    FOOTBALL
      COLLEGE
        STATE UNIVERSITY
          COACHING

NEWS
    SPORTS
        BASEBALL
        FOOTBALL
    BUSINESS
        MARKET WATCH
118 ——     EMPLOYMENT
    LOCAL
        OBITUARIES
    NATIONAL
        FOREIGN AFFAIRS
        ELECTIONS

NEWS
    LOCAL
        OBITUARIES
    BUSINESS
        MARKET WATCH
        EMPLOYMENT
    NATIONAL
        FOREIGN AFFAIRS
        ELECTIONS
    SPORTS
        BASEBALL
        FOOTBALL

*FIG. 8B*

☐ NEWS —113
　☐ SPORTS —115
　☐ BUSINESS —115
　☐ LOCAL —115
　☐ NATIONAL —115
　　☐ FOREIGN AFFAIRS —117
　　☐ ELECTIONS —117

FIG. 8C

SYSTEM AND METHOD FOR DEVELOPING A WEBSITE

BACKGROUND OF THE INVENTION

1. Field of the Invention

The present invention generally relates to a system and method for developing a website. More particularly, the present invention allows a website to be created and updated by a non-technical user without knowledge or skills in programming Hypertext Markup Language (HTML) or other web-based programming.

2. Background Art

In business, the use of world wide websites has become an important tool in success. As such, many of today's businesses either have or are currently developing a website. One typical purpose of a website is to provide information to the public in an attempt to attract customers. In addition, many businesses develop websites that enable customers to transact goods/services directly on-line. Currently, developing websites requires a programmer who can program in Hypertext Markup Language (HTML) or other web-based languages. The programmer will generally take content provided by business and convert it into HTML for posting to the website. Although effective, this system has many drawbacks. For example, it requires businesses to employ or contract the services of an expert HTML programmer, which can be extremely costly. Moreover, a programmer must be used every time website updating is needed. Since web content may need to change frequently and quickly in response to business needs, updates can be frequent occurrences.

Heretofore, attempts have been made to provide improved systems for developing a website in which the need for HTML programming is minimized. Such attempts, however, generally fail to provide a way to develop a website completely free of the need for HTML programming skill. That is, some level of HTML programming is still required. In addition, existing systems fail to provide much flexibility in developing the website. For example, existing systems fail to provide a way to define categories for the web pages, and assign creator groups to each category. This would allow generation of content to be controlled so that only creator groups assigned to a particular category could create or update (define) content for the particular category. Moreover, existing systems fail to provide a way to dynamically define and depict a site diagram (i.e., a hierarchical relationship between the web pages) through link documents that point to a web page in the hierarchy. Such a feature would better enable the creators of the website to easily arrange, rearrange and/or view particular web pages within the website. Still yet, existing systems fail to provide a breadcrumb system for providing a reader of the website with a browsing history that includes a list of web pages and corresponding links. Such a feature would allows the reader to see what web pages he/she has visited, and easily return to a particular page by selecting the corresponding link. Moreover, existing systems fail to provide a way to receive, track and handle feedback for the website. Since reader feedback can be highly effective in the success of a website, a system for receiving, tracking and handling the feedback can be essential.

These any many other features are not currently provided by existing systems and, accordingly, a need exists for an improved system and method for developing a website.

SUMMARY OF THE INVENTION

The present invention generally relates to a system and method for developing a website. Specifically, the system and method of the present invention allow a website to be developed (created and updated) without the need of an expert (e.g., HTML) programmer. In general, the present invention allows administrators of the website to establish categories for the web pages of the website, and assign creator groups thereto. This allows for creation and updating of content in a particular category to be limited to only the corresponding assigned creator group. The present invention also allows for breadcrumb code to be inserted into the web pages so that readers of the website can track their movement throughout the site. In addition, the present invention provide for the receipt, tracking and handling of feedback related to the website. The present invention also provides many additional features as will be further described below.

According to a first aspect of the present invention, a system for developing a website is provided. The system comprises: (1) a content system for providing content for web pages of the website, wherein the web pages have defined categories into which the content is arranged; (2) a site diagram system for dynamically defining and depicting a relationship between the web pages;
(3) a calendar system for defining a calendar within the website; (4) a breadcrumb system for inserting breadcrumb code into the web pages; and (5) a feedback system for receiving and tracking feedback related to the website.

According to a second aspect of the present invention, a system for developing a website is provided. The system comprises: (1) a content system for providing content for web pages of the website; (2) a category system for defining categories for the web pages and for assigning creator groups thereto, wherein the creator groups can define content only for assigned categories; (3) a site diagram system for dynamically defining and depicting a hierarchical relationship between the web pages; (4) a breadcrumb system for inserting breadcrumb code into the web pages; and (5) a feedback system for receiving and tracking feedback related to the website.

According to a third aspect of the present invention, a method for developing a website is provided. The system comprises: (1) defining categories for web pages of the web site; (2) assigning a creator group to each of the categories; (3) providing content in a non-HTML format, and arranging the received content into the categories; (4) defining and depicting a hierarchical relationship between the web pages; (5) inserting breadcrumb code into the web pages; and (6) receiving and tracking feedback related to the website.

According to a fourth aspect of the present invention, a program product stored on a recordable medium for developing a website is provided. When executed, the program product comprises: (1) program code for providing content for web pages of the website, wherein the web pages have defined categories into which the content is arranged; (2) program code for defining and depicting a hierarchical relationship between the web pages; (3) program code for defining a calendar within the website; (4) program code for inserting breadcrumb code into the web pages; and (5) program code for receiving and tracking feedback related to the website.

Therefore, the present invention provides a system and method for developing a website.

BRIEF DESCRIPTION OF THE DRAWINGS

These and other features of this invention will be more readily understood from the following detailed description of the various aspects of the invention taken in conjunction with the accompanying drawings in which:

FIG. 4 depicts an exemplary breadcrumb list according to the present invention.

FIG. 6 depicts a first exemplary interface of the function system of FIG. 5.

FIG. 8A depicts a hierarchical relationship between web pages established using the interface of FIG. 7.

FIG. 8B depicts the hierarchical relationship of FIG. 8A updated using the interface of FIG. 7.

FIG. 8C depicts a hierarchical relationship between web pages in a drill down fashion.

Figure 1:
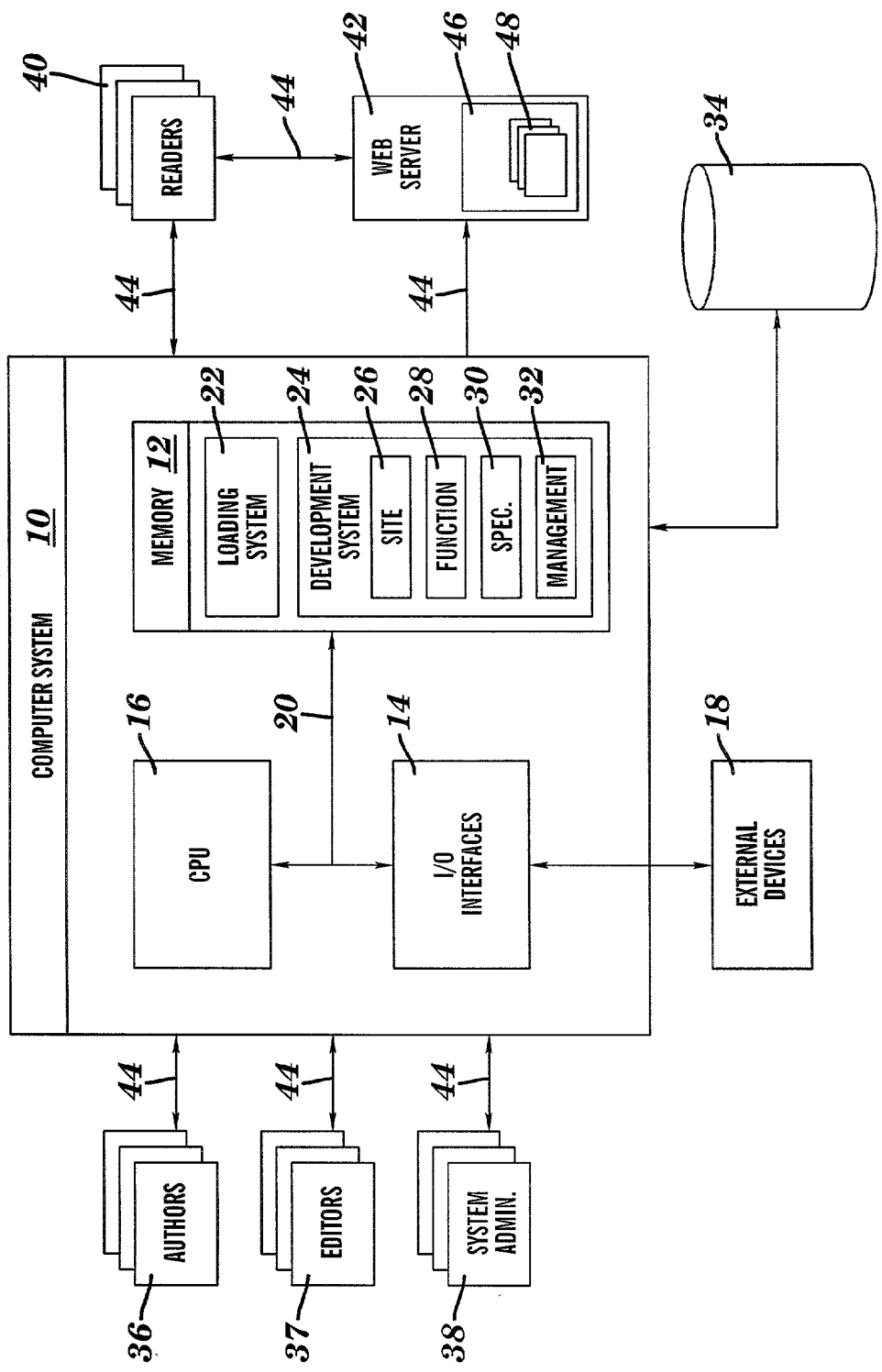
FIG. 1 depicts a computer system having a development system according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a system and method for developing a website without the creators having to program in HTML or another web-based language.

Referring now to FIG. 1, computer system 10 having loading system 22 and development system 24 according to the present invention is shown. Authors 36, editors 37 and administrators 38 (collectively referred to as creators) will utilize computer system 10 to develop world wide website 46.

As depicted, computer system 10 generally comprises memory 12, input/output (I/O) interfaces 14, a central processing unit (CPU) 16, external devices/resources 18, bus 20, and database 34. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including speakers, a CRT, LED screen, hand-held device, keyboard, mouse, voice recognition system, speech output system, printer, monitor, facsimile, pager, etc. Bus 20 provides a communication link between each of the components in the computer system 10 and likewise may comprise any known type of transmission link, including electrical, optical, wireless, etc. In addition, although not shown, additional components, such as cache memory, communication systems, system software, etc., may be incorporated into computer system 10.

Database 34 provides storage for information necessary to carry out the present invention. Such information could include, inter alia: (1) content; (2) creator identifications and roles; (3) subscribed readers 40; (4) web page categories; (5) creator groups; (6) website 46 update records; (7) reader 40 feedback; and (8) creator group-category assignments. Database 34 may include one or more storage devices, such as a magnetic disk drive or an optical disk drive. In another embodiment database 34 includes data distributed across, for example, a local area network (LAN), wide area network (WAN) or a storage area network (SAN) (not shown). Database 34 may also be configured in such a way that one of ordinary skill in the art may interpret it to include one or more storage devices. Moreover, it should be understood that database 34 could alternatively exist within computer system 10.

Stored in memory 12 is loading system 22 and development system 24. Under the present invention, authors 36 will prepare content in a non-HTML format for posting to website 46 using development system 24. Loading system 22 will convert the content to HTML format and, optionally, load the web pages onto web server 42. It should be understood that web server 42 is optional and that computer system 10 could be a web server in and of itself. In this case, the loading of web pages to a separate system would be unnecessary. In a typical embodiment, loading system 22 is Lotus Domino, currently available from International Business Machines Corp.

Communication with computer system 10 and web server 42 (if implemented) occurs via communication links 44. Communications links 44 can include a direct hardwired connection (e.g., serial port), or an addressable connection such as a remote system in a client-server environment. In the case of the latter, the client and server may be connected via the Internet, wide area networks (WAN), local area networks (LAN) or other private networks. The server and client may utilize conventional token ring connectivity, Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system.

It is understood that the present invention can be realized in hardware, software, or a combination of hardware and software. Moreover, computer system 10 according to the present invention can be realized in a centralized fashion in a single computerized workstation, or in a distributed fashion where different elements are spread across several interconnected systems (e.g., a network). Any kind of computer/server system(s)—or other apparatus adapted for carrying out the methods described herein—is suited. A typical combination of hardware and software could be a general purpose computer system with a computer program that, when loaded and executed, controls computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

As depicted in FIG. 1, development system 24 includes site system 26, function system 28, specification system 30 and management system 32 which perform the various features to be described below. It should be understood in advance that each of these systems (as well as the sub-systems thereof) include interfaces for authors 36, editors 37, administrators 38, and readers 40 to interact with development system 24. Although some of such interfaces will be depicted herein for exemplary purposes, it should be understood that other interfaces that have not been shown herein could be implemented.

Figure 2:
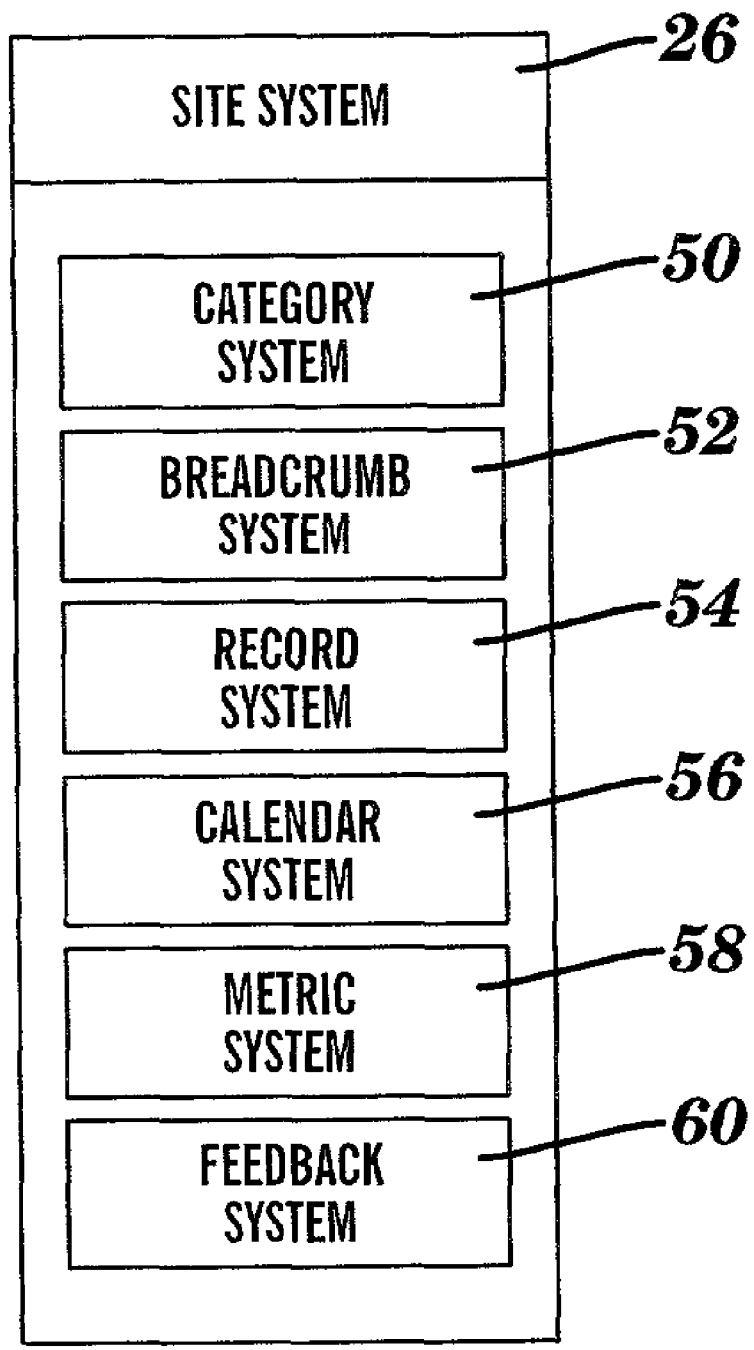
FIG. 2 depicts the site system of FIG. 1.

Referring now to FIG. 2, site system 26 is shown in further detail. As shown, site system 26 includes category system 50, breadcrumb system 52, record system 54, calendar system 56, metric system 58 and feedback system 60. Category system 50 allows administrators 38 to define (i.e., establish and update) categories for the web pages 48 of website 46. Specifically, it may be desirous to segment website 46 into categories of information. For example, a news-based website may wish to have the categories of sports, business, local and national. Categorizing web pages 48 under the present invention provides the capability to assign creator groups to each category. For example, creator group A could be assigned to the sports category while creator group B could be assigned to the business category. Thus, submission or editing of content for a particular category is limited to the group assigned thereto. For example, group A could not submit or edit content for the business category. This form of access control helps maintain the security and accuracy of website 46. Moreover, this categorization helps keep web pages 48 organized. It should be understood that each group typically has at least one author 36 who will provide content for the corresponding category. However, it should also be understood that creator groups could also include editors 37 and/or administrators 38.

Figure 3:
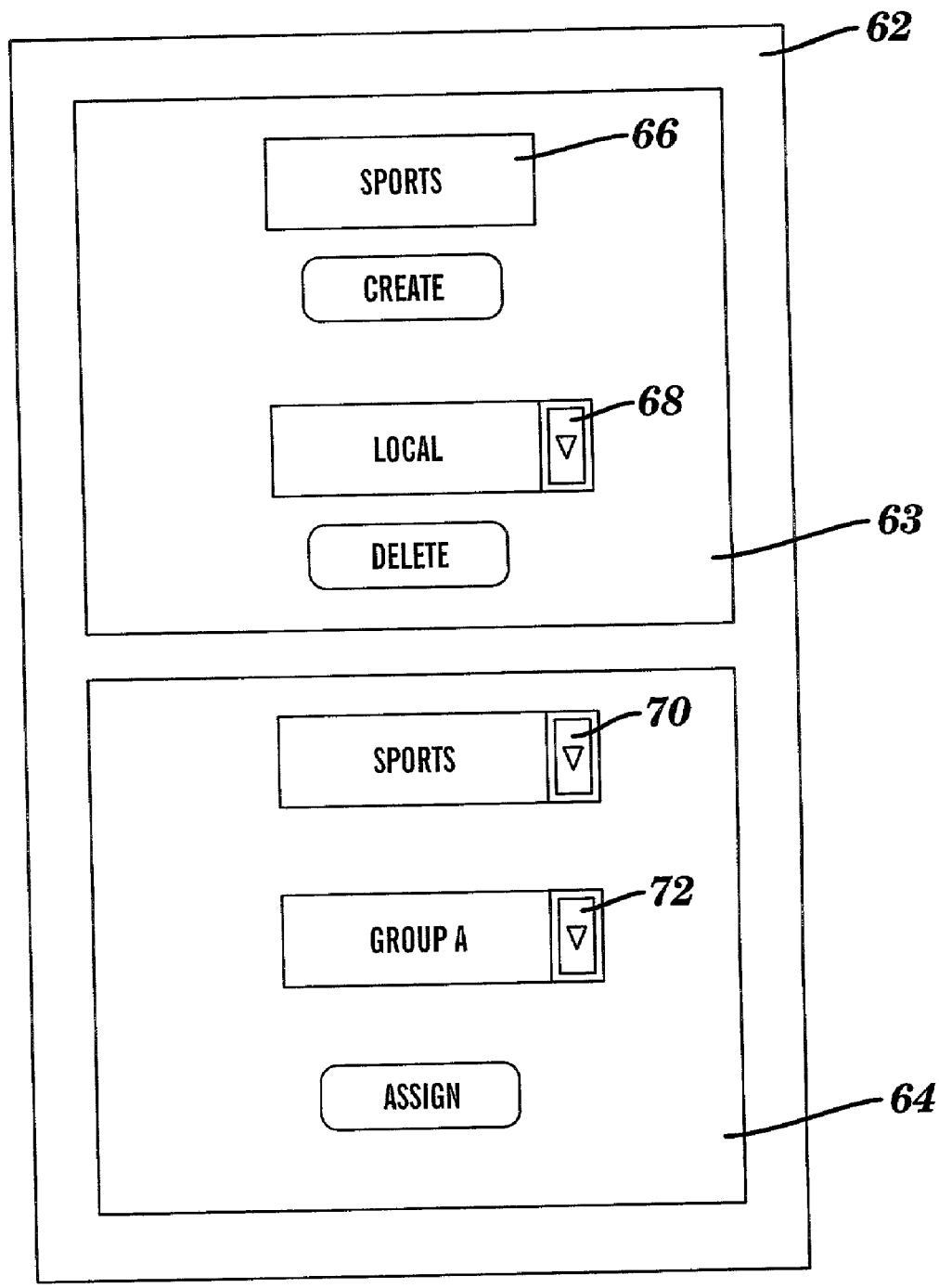
FIG. 3 depicts an exemplary interface of the site system of FIG. 2.

Referring to FIG. 3, an exemplary interface 62 for defining categories and assigning groups is shown. Category window 63 allows administrator 38 to define the categories. Specifically, using field 66 a category can be created. Conversely, using menu 68, an existing category can be deleted. Assignment window 64 allows administrators 38 to assign categories to creator groups. For example, an administrator 38 could use menu 70 to select a particular category and menu 72 to assign a particular group to that category. As indicated above, this will ensure access control as well as provide a means for dividing the responsibility of developing website 46 among segments of creators. In a typical embodiment, each creator group includes at least one author 36 and an optional editor 37 who will edit content submitted by authors 36. Once edited, the content is subject to a final approval of administrator 38. If an editor 37 is not available, administrator 38 can perform any necessary editing.

Referring back to FIG. 2, breadcrumb system 52 allows creators (e.g., typically administrator 38) to decide whether breadcrumb code is to be inserted into web pages 48. Breadcrumb code allows a hierarchical list of web pages and corresponding links to be displayed for a reader 40 (e.g., a visitor) of the website. Specifically, when breadcrumb code is inserted into web pages 48, reader 40 will be able to view a list of the web pages he/she has visited in website 46 during the session. By selecting the corresponding underlying links, the reader 40 can return to a previously visited web page 48. FIG. 4 depicts this feature in further detail. As shown, reader 40 is currently viewing the coaching web page and has previously visited the web pages 48 of: news—sports—baseball—football—college—state university during his/her present session. If reader 40 wishes to return to the baseball site he/she can achieve this simply by selecting baseball in FIG. 4. Thus, the breadcrumb feature, if activated by the creators, allows readers 40 to see their relative position within the site hierarchy.

Record system 54 of FIG. 2 keeps track of all changes to website 46 as they occur. For example, if content submitted by an author 36 is made active (i.e., posted on the site), a record of the date/time will be stored in database 34. Similarly, if content is edited or deleted, a record will be made in database 34. Calendar system 56 allows creators to define a personal (or corporate) calendar for posting on website 46. Specifically, one or more web pages 48 could be dedicated to a calendar of events so that readers 40 can easily see upcoming events or appointments. Metric system 58 tracks all access statistics regarding website 46. Specifically, it could be useful to the creators to know what web pages 48 are visited and/or what links are selected. Metric system 58 stores such statistics in database 34 for future mining by the creators.

Feedback system 60 provides a mechanism for receiving, tracking and handling feedback from readers 40. Specifically, one of the web pages 48 could include a feedback button or the like. Once selected by a reader 40, a reader interface could be provided for reader 40 to submit any feedback related to the website 46 or the content posted thereon. Such feedback would be received by feedback system 60 and stored in database 34. One or more creators could then be assigned (e.g., by administrator) to address the feedback. The assignment could also be tracked to ensure that feedback does not go unaddressed. For example, database 34 could include a table that indicates to whom each piece of feedback is assigned, and whether the feedback has been addressed.

Figure 5:
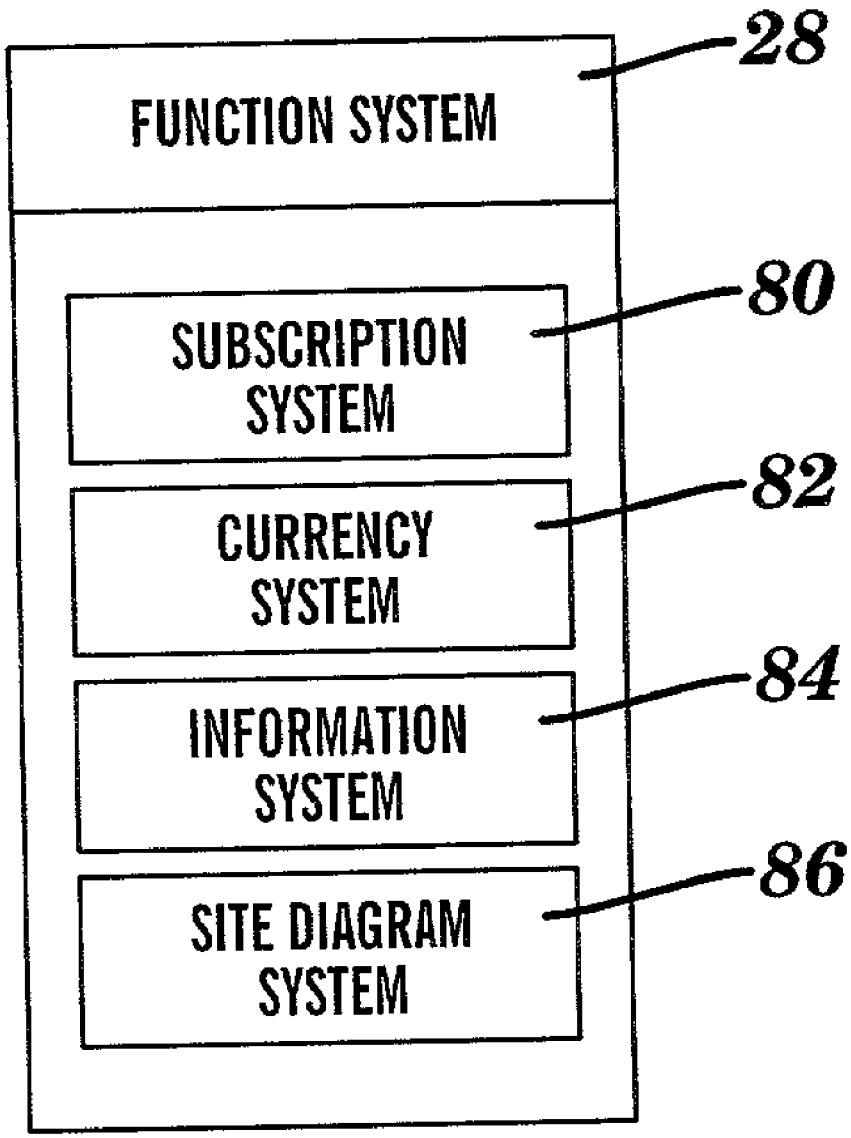
FIG. 5 depicts the function system of FIG. 1.

Referring now to FIG. 5, function system 28 is shown in greater detail. As depicted, function system includes subscription system 80, currency system 82, information system 84 and site diagram system 86. Subscription system 80 allows readers 40 to subscribe to website 46 or individual categories thereof. By having subscription system 80, creators can control access to website 46. Moreover, subscription system 80 can generate and send alerts to readers 40 when new content is posted to website 46.

Figure 6:
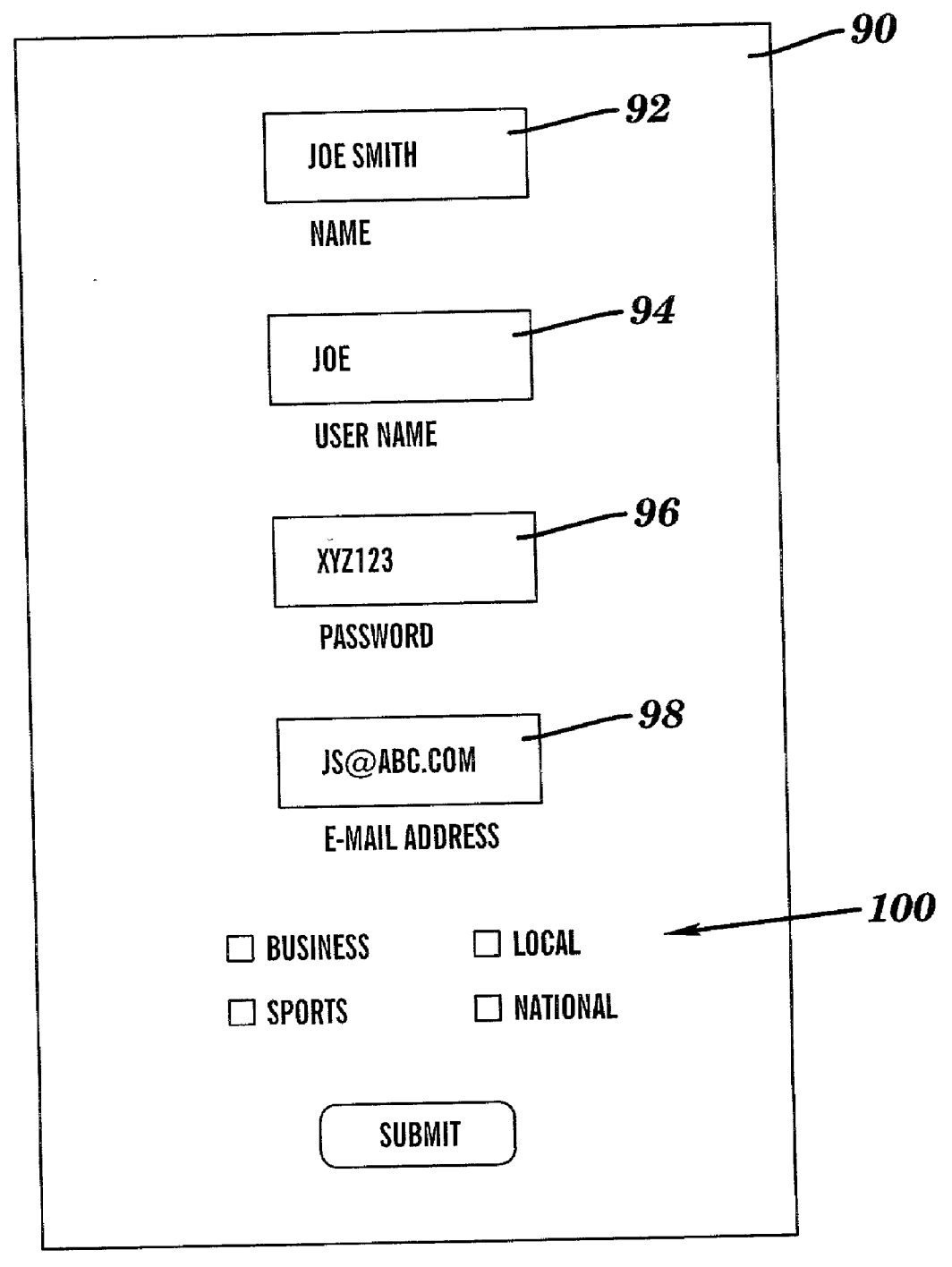

FIG. 6 shows an exemplary interface 90 that can be used by readers 40 to subscribe to website 46 (or categories thereof). As depicted, reader 40 can designate: (1) his/her name in name field 92; (2) an optional user identification in identification field 94; (3) an optional password in password field 96; and (4) his/her e-mail address in e-mail field 98. Reader 40 can also individually select categories 100 of interest. By selecting individual categories 100, reader 40 can receive alerts (e.g., electronic) whenever new content related to a selected category is posted on website 46. For example, if the reader 40 selected the local category, and new local content was posted, an alert would be sent to the reader 40. Moreover, individual selection of categories could provide a mechanism by which access to categories of documents is limited to a specific group of authorized readers 40. Specifically, if a reader 40 only selected the business and sports categories, he/she might not be able to access the areas on the website 46 pertaining to the local and national categories. This would provide the creators with a way to charge fees for access to various areas of website 46. It should be understood that the depiction of interface 90 is for exemplary purposes only, and alternative embodiments could be implemented. For example, reader 40 need not submit a user identification or password.

Referring back to FIG. 5, currency system 82 ensures that content on website 46 is kept current by sending a reminder (e.g., electronic) to authors 36 to update their content. For example, currency system 82 could send a periodic reminder to authors 36 in group A (i.e., the group assigned to the sports group) to update the sports scores on website 46. The reminder could be sent according to any desired schedule (e.g., daily, weekly, monthly, etc.). Moreover, administrator 38 can typically define how long an author's content can go without being updated before the author should receive the reminders. This time period is generally designated via a content currency interface (not shown) of currency system 82.

Information system 84 generates a list of new content that have been posted to website 46 as well as when the content was added. For example, if a reader 40 visits website 46, the first page 48 could have the list (generated by information system 84) of the recent additions to website 46. This prevents reader 40 from having to discern for his/herself what new content has been posted.

Figure 7:
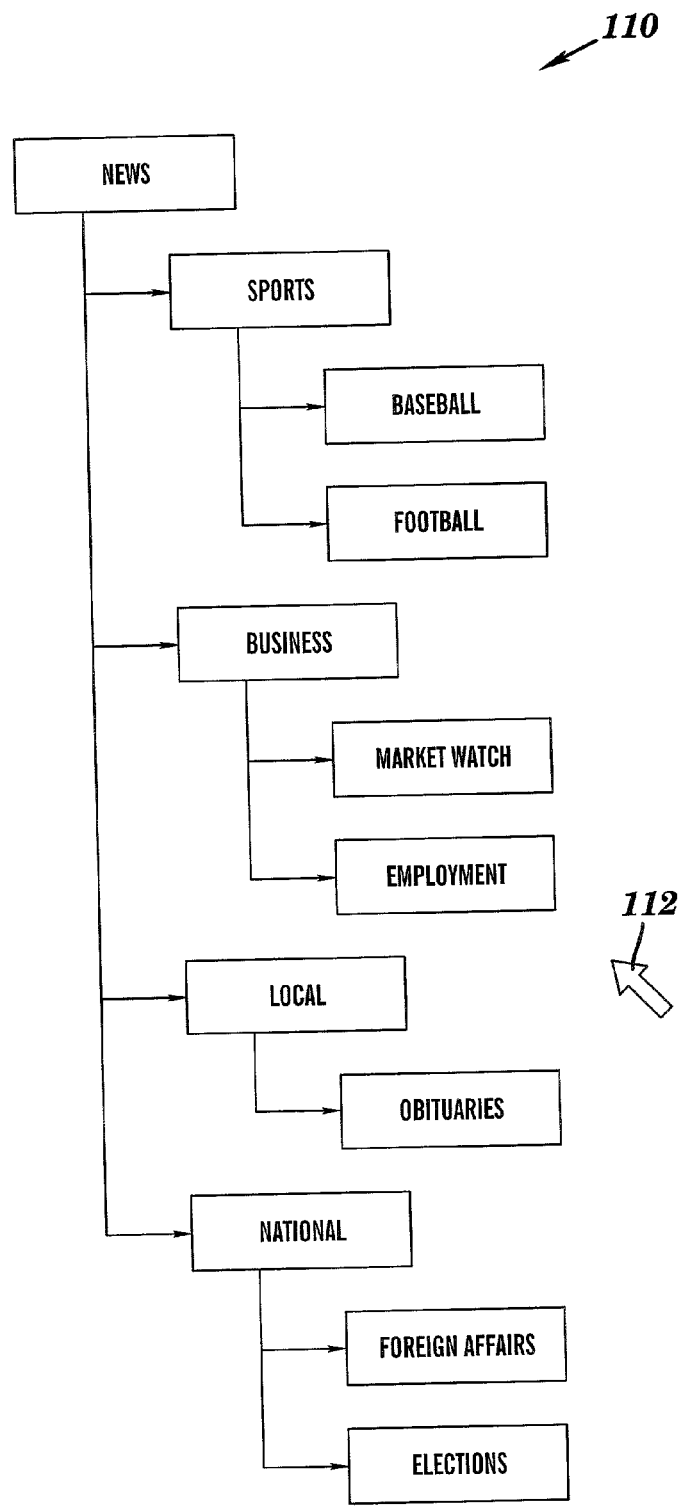
FIG. 7 depicts a second exemplary interface of the function system of FIG. 5.

Site diagram system 86 allows creators to define (i.e., establish and update) a site diagram for website 46. For example, as shown in FIG. 7, a site diagram interface 110 could be provided at which creators could use a mouse or other input device 112 to define the hierarchical site diagram for website 46. In a typical embodiment, the site diagram is defined based upon categories (as shown in FIG. 7). However, it should be appreciated that the site diagram could be defined based upon individual web pages 48. In either event, the definition given to the site diagram will determine the order in which readers 40 view web pages 48 when they visit website 46. Once defined, site diagram system 86 can output the site diagram for display on website 46.

Referring to FIG. 8A, site diagram 114 corresponding to interface 110 of FIG. 7 is shown. As depicted, site diagram 114 is a hierarchical list of categories (or web pages 48) of website 46, which sets forth the relationship between each web page 48. In a typical embodiment, site diagram 114 is displayed on its own web page 48 and has underlying links (similar to the breadcrumb list of FIG. 4). Thus if a reader 40 wishes to go directly to the employment web page 48, he/she can do so by selecting the employment category 118 in site diagram 114. FIG. 8B depicts site diagram 116 after updating via interface 110. Specifically, by clicking and dragging categories (or web pages) on interface 110, website 46 can be rearranged as shown.

In addition to the entire site hierarchy as shown in FIGS. 8A-B, site diagram system 86 (of FIG. 5) can also provide a hierarchy of web pages 48 in a drill down fashion. Specifically, as shown in FIG. 8C, when the home page 113 is showing, all level "1" pages 115 will be displayed. Selecting (e.g., clicking) any one of the level "1" pages 115 will reveal the level "2" pages 117 under the selected level "1" page. This process could be repeated for all subsequent levels. Accordingly, site diagram system 86 provides both an overall map of the site 46 as well as individual pages 48 in a drill down fashion.

Figure 9:
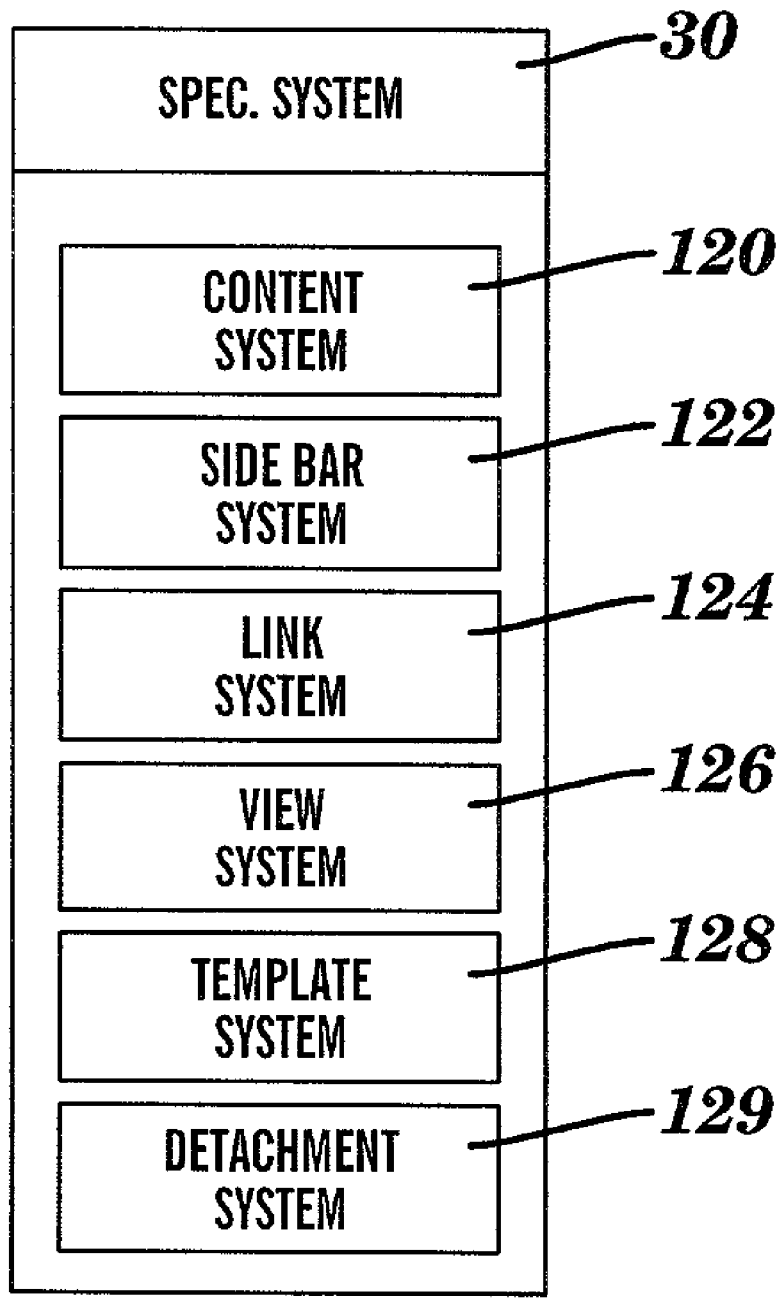
FIG. 9 depicts the specification system of FIG. 1.

Referring now to FIG. 9, specification system 30 is shown in greater detail. As depicted, specification system 30 includes content system 120, side bar system 122, link system 124, view system 126 and template system 128. Content system 120 provides the mechanism by which content is posted to website 46. Specifically, using content system 120 creators such as administrators 38 can post content on web pages 48. In a typical embodiment, authors 36 will submit content written in any standard application such as word processing programs, graphics programs, etc. This allows authors 36 to provide content documents in a non-HTML format. Moreover, content submitted by authors 36 are typically subject to editing by editor 37 and/or final approval by administrator 38 (with administrator 38 being the final "gatekeeper" on posting content to website 46). This allows for content to be thoroughly screened before posting on website 46. As will be further described below, under the present invention a content document submitted by an author 36 is defined as a "draft" until edited by an editor 37 or administrator 38. Once edited, the content document reaches "pending" status at which point loading system 22 can format and post the content. Once the content document is actually posted to website 46 by administrator 38, the content document becomes "active."

Side bar system 122 allows for side bars of content to be posted on web pages. For example a single web page might include the categories of sports and business as well as a side bar. The side bar can have whatever content the creators desire. For example, the side bar could be an advertisement, additional content related to one of the two categories, a listing of newly posted content throughout the website 46, etc. Similar to categories, side bars could be assigned to particular groups and be made subject to editing and/or approval as described above.

Link system 124 provides a mechanism for inserting links into the web pages 48 along with content documents. For example, if the creators desire to include a link with an article, link system 124 can be used. When determining to insert a link into a web page 48, the creators can also decide whether selection of the link by a reader 40 would spawn a new web page, or just move to the link address through the current web page. One example of when a link might be inserted is when an author 36 wishes to insert a link to a related story in one of their articles. It should be noted that such links are not limited to other content on website 46. Rather, the creators could decide to include a link to a different website.

View system 126 allows the creators to define a list of posted (i.e. active) content with corresponding links for readers 40. This can be done according to any predetermined criteria. For example, the creators could create a list of content related to a particular article. In any event, the list typically includes links (similar to the breadcrumb list and site diagram) so that readers 40 can be brought to the corresponding content documents simply by selecting (e.g., clicking) the item on the list.

Template system 128 allows the creators (typically administrator 38) to define a template for the overall look and feel of website 46. For example, the creators might desire the first page of website 46 to have two columns (one for sports and one for business) with a green background and a company logo, while the second web page has one column (for local news) with a white background and no logo. Thus, when content documents are approved for posting, there is no layout to be performed, the content documents can be formatted (e.g., by content system 120) to be positioned in the defined location in website 46. Detachment system 129 is where creators can individually select content items for removal from website 46.

Figure 10:
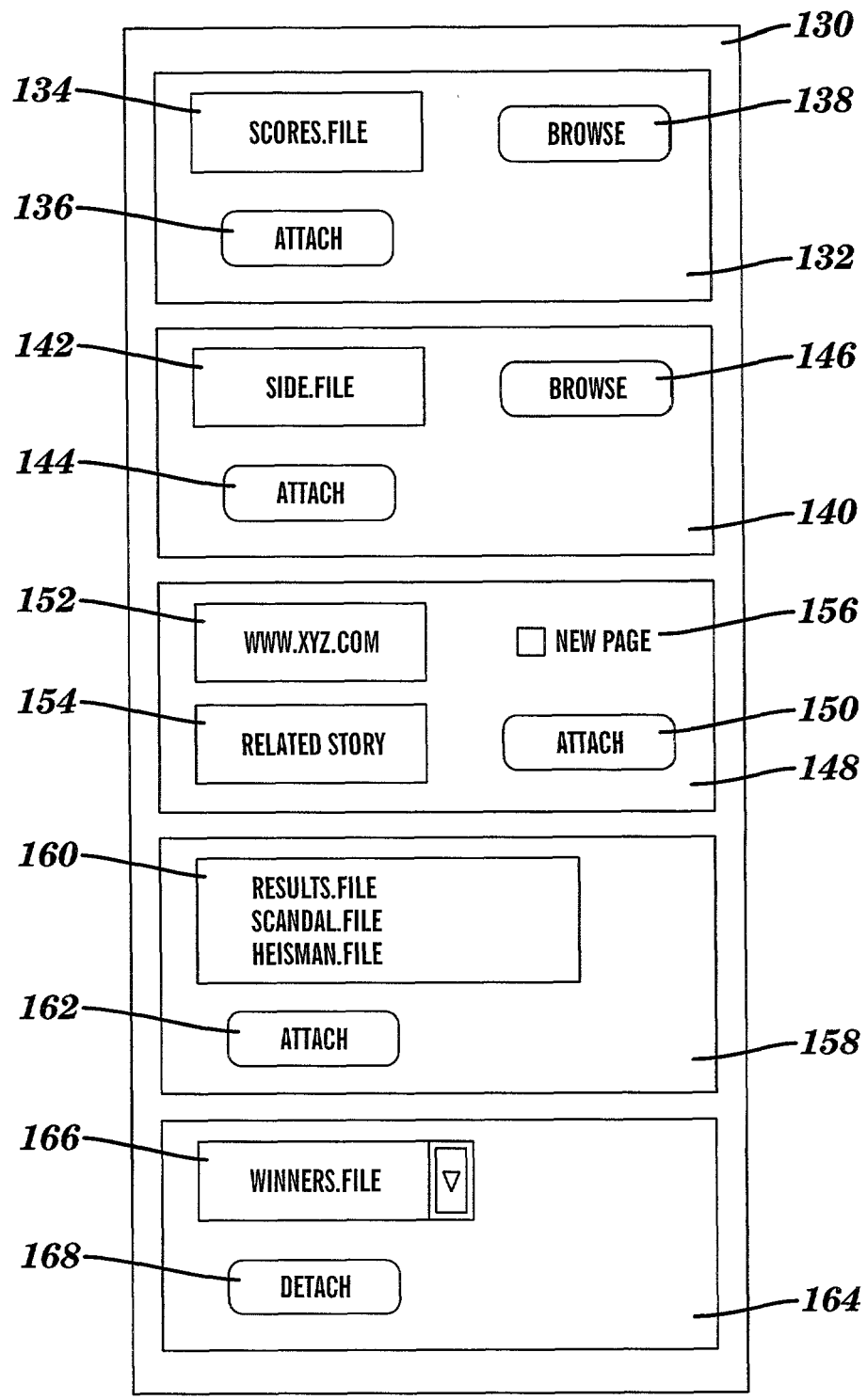
FIG. 10 depicts an exemplary interface of the specification system of FIG. 8.

Referring now to FIG. 10, an exemplary specification interface 130 is shown. Typically, interface 130 is representative of that which an administrator 38 would use in promoting (posting) content documents and other material for posting to website 46. However, it should be understood that any creator with permission could ultimately use interface 130 to effect posting of material to website 46.

Content window 132 is where creators can attach content such as articles for posting to website 46. As indicated above, such content is typically provided in a non-HTML format by authors 36. This allows the authors 36 to submit any content directly from their application programs without authors 36, editors 37 or administrators 38 having to convert to a different format. Once submitted by authors 36, the content can be edited by editors 37 and then approved for posting by administrators 38. Document field 134 is where specific content is identified for posting. When attach button 136 is selected, the content identified in document field 134 will be posted to website 46. Browse button 138 allows the creators to browse for content documents for posting. When content is posted, it will be arranged according to the template defined via template system 128.

Sidebar window 140 is where side bar content can be added to a side bar as described above. To this extent, side bar window 140 functions similar to content window 132. Specifically, side bar content can be identified in side bar field 142 and attached via attach button 144. Alternatively, side bar content can be searched for via browse button 146. If no side bar is desired, side bar field 142 can be left blank.

Link window 148 is where links can be defined for insertion in website 46. As shown, a web address for the link is inserted into link field 152 and a corresponding description is defined in description field 154. The description defined in description field 154 is what readers 40 will see when viewing website 46. By selecting the displayed description on website 46, readers 40 will be routed to the web address defined in link field 152. New page selector 156 allows the creators to determine whether selection of the displayed description by readers 40 will spawn a new page with the link address, or simply route the readers 40 from the currently displayed page. Once all information has been defined for link window 148, the link can be submitted via attach button 150.

View window 158 is where the above-described list of currently posted content can be defined. As shown, the creators have included three content items in the list via view field 160. These items can be, for example, related to a particular article that is posted. Once attached via attach button 162, the listed content items will be placed into a list that is displayed for readers 40. By selecting an individual content item in the list, the corresponding content will be displayed for the reader 40. Detachment window 164 is where creators can remove content from website 46. Specifically, each content item posted on website 46 is listed in detachment menu 166. A creator could then individually selected items for removal from site using detachment button 168.

Figure 11:
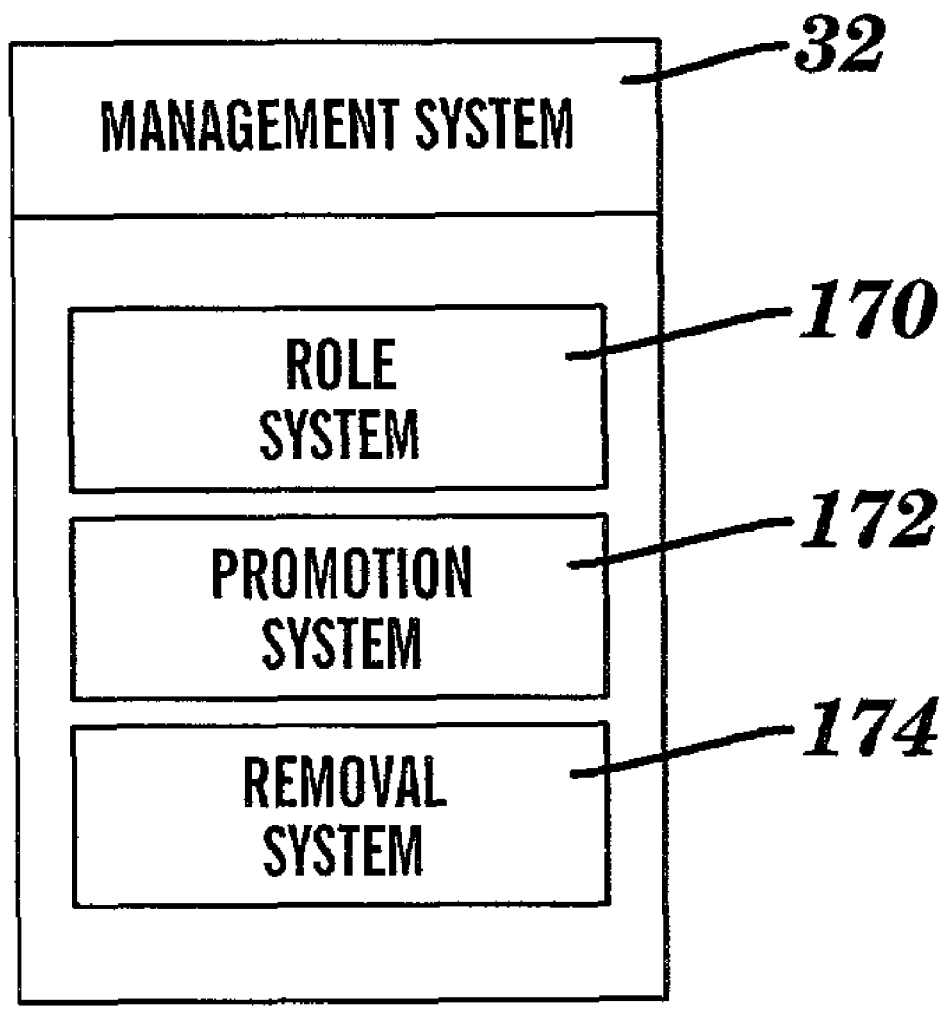
FIG. 11 depicts the management system of FIG. 1.

Referring now to FIG. 11, management system 32 is shown in greater detail. As depicted, management system 32 includes role system 170, promotion system 172 and removal system 174. Role system is where each creator is assigned a role such as author 36, editor 37 or administrator 38. This assignment can ultimately determine the "permissions" each creator has for developing website 46. For example, a creator identified as an author 36 will typically not have permission to approve the posting of content documents to website 46. Rather, authors 36 will typically only submit their content documents for approval by editors 37 and/or administrators 38 (e.g., via specification interface 130 of FIG. 10). Role system 170 is also where creator groups can be defined, and where creators can be assigned to particular groups. As indicated above, creator groups are then assigned to categories. Promotion system 172 is where a promotion schedule is defined. Specifically, it can be defined whether content submitted via specification interface 130, is posted to website 46 immediately or after a waiting period (e.g., overnight). Removal system 174 is where creators (e.g., administrators 38) can define whether removed content is hidden, deleted from the system or archived in database 34. Specifically, if content is removed from website 46 (i.e., via detachment system 129), it can be hidden from view, deleted from existence or archived for future reference.

Figure 12:
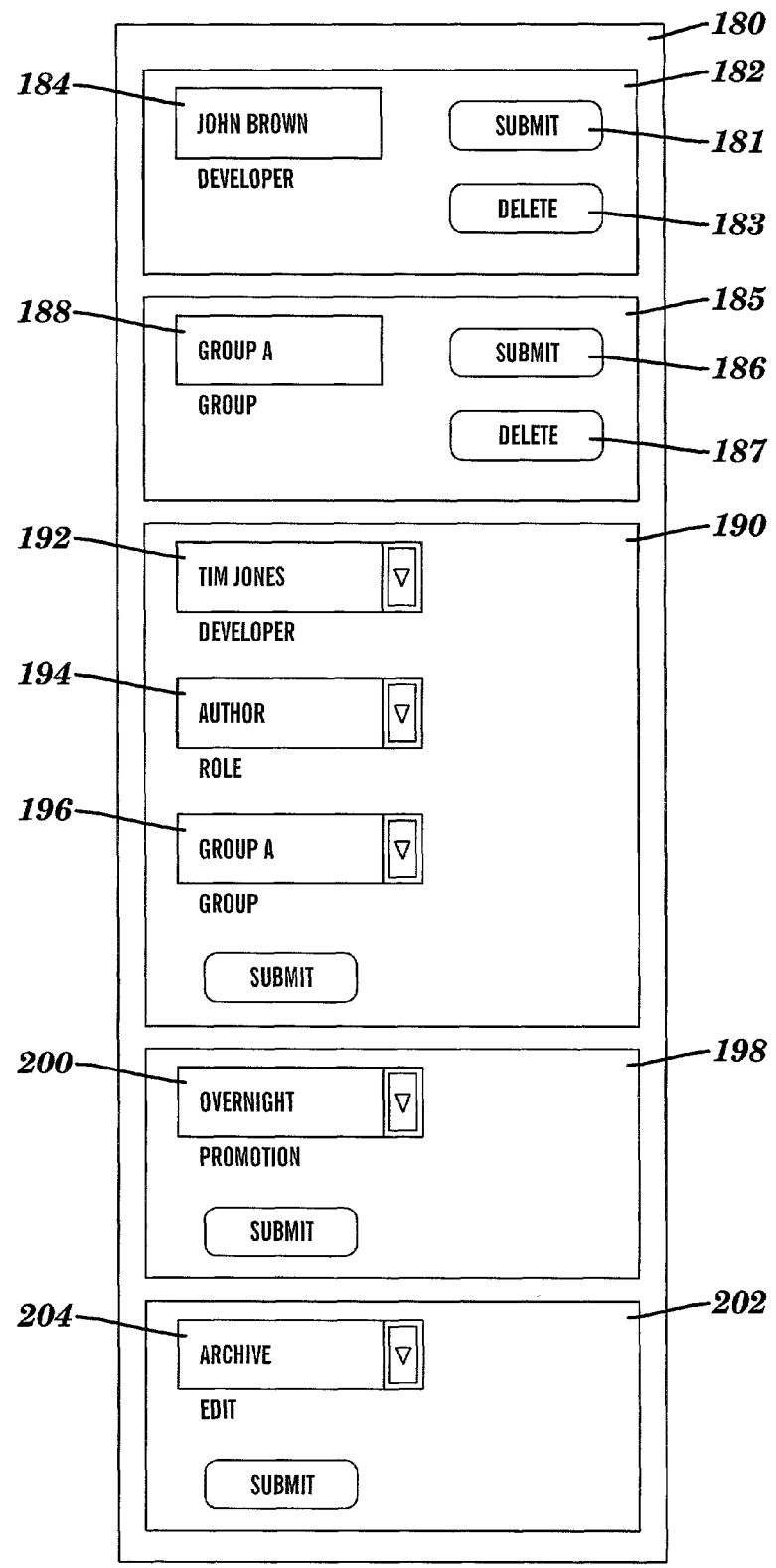
FIG. 12 depicts an exemplary interface of the management system of FIG. 11.

Referring now to FIG. 12, an exemplary management interface 180 is shown. Creator window 182 is where creators can be defined (e.g., added or deleted). Specifically a creator name can by input into creator field 184. If the creator is a new creator to be added to the system, submit button 181 will be selected. Conversely, if the identified creator is to be deleted from the system, delete button 183 will be selected. Group window 186 is where creator groups can be defined. Similar to individual creators, a group name will be defined in group field 188 and added via submit button 185, or deleted via delete button 187. Assignment window 190 is where individual creators will be assigned with a role and to a group. Specifically a particular creator is selected via creator menu 192, assigned with a role via role menu 194 and then assigned to a group via group menu 196. As indicated above, the creator groups are assigned to categories via category system 50 of FIG. 2. Promotion window 198 is where the promotion schedule for content (e.g., content documents, side bar documents, links, etc.) submitted via specification interface 130 is defined. Specifically, content submitted via interface 130 could be scheduled for immediate posting to website 46 or for delayed posting. In any event, the promotion schedule will be selected via promotion menu 200. Storage window 202 is where the fate of content removed from website 46 (i.e., via detachment system 129) will be determined. Specifically, removed content can be hidden from view on website 46, archived in database 34 or deleted entirely. In any event, this will be selected via storage menu 204.

Figure 13:
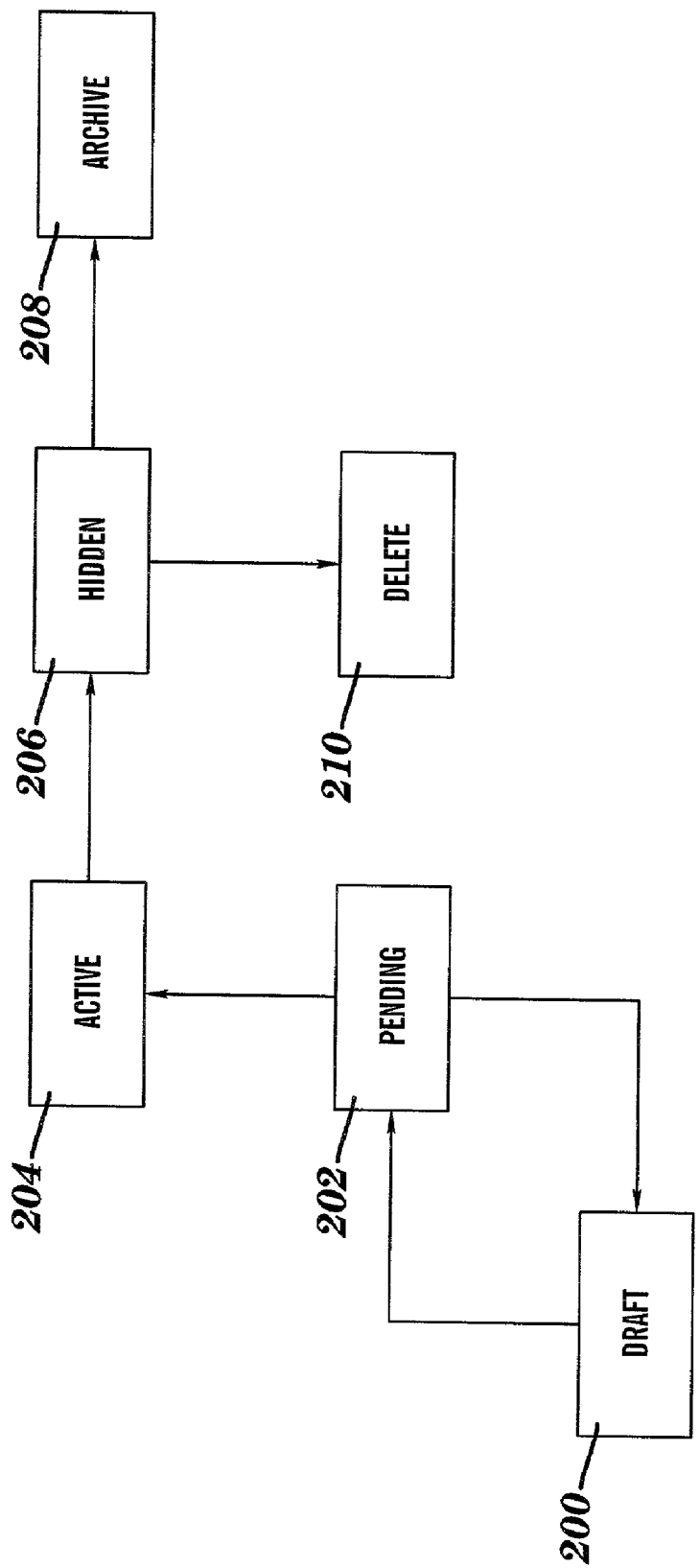
FIG. 13 depicts a content flowchart according to the present invention.

Referring now to FIG. 13, a content document flowchart is depicted. As indicated, a draft 200 is initially proposed by an author 36. An editor 37 or administrator 38 can edit the draft. During this process, the content document could return to author 36. Once the draft has been edited and approved by administrator 38, the content document is considered to be pending 202 (i.e., awaiting posting on website 46). Once posted on the website, the content document is considered to be active 204. As indicated above, once posted, a content document can then be hidden 206, archived 208 or deleted 210.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, it should be understood the depiction of the various sub-systems of the present invention are shown grouped into site system 26, function system 28, specification system 30 and management system 32 for exemplary purposes only. Accordingly, alternative arrangements of the systems could exist.

The invention claimed is:

1. A system for developing a website, comprising at least one computer device that performs a method, comprising:
    enabling a developer of the website to provide content for web pages of the website, wherein the web pages have defined categories based on location within the website into which the content is arranged, each category being defined based on a type of subject matter of information in the content;
    enabling the developer to dynamically define and depict a relationship between the web pages;

enabling the developer to define a calendar within the website that a user uses to keep track of calendaring information;

enabling the developer to specify whether breadcrumb code is inserted into the web pages; and enabling the developer to define a feedback mechanism for receiving and tracking feedback related to the website from the user, wherein the content, the relationship, the calendar, the breadcrumb code, and the feedback mechanism of the website are adapted to be developed by a developer that has no knowledge of web-based programming and has no knowledge of Hypertext Markup Language (HTML).

2. The system of claim 1, the method further comprising:

enabling the developer to define the categories and assigning creator groups thereto, wherein the content for the categories can be defined only by the assigned creator groups;

tracking changes to the content; and tracking access to the web pages, wherein the creator groups include creators chosen from the group consisting of: authors who prepare the content for posting to the website, editors who edit the content submitted by the authors and administrators who approve the content.

3. The system of claim 1, the method further comprising:

subscribing to the website and for generating an alert to subscribers when new content is posted on the website;

generating a reminder to update the content; and generating a list of new content that is posted to the website.

4. The system of claim 1, the method further comprising:

defining a side bar of information;

defining links within the content;

generating a list of current content and corresponding links, based on at least one predetermined criterion; and defining a template for the web pages.

5. The system of claim 1, the method further comprising:

defining roles of creators of the website;

defining a promotion schedule for content to be posted on the web pages; and defining whether the content is hidden, deleted or archived.

6. The system of claim 1, the method further comprising converting the content from a non-HTML format into an HTML format and for loading the web pages onto a web server.

7. The system of claim 1, wherein the breadcrumb code allows a reader of the website to view a list of web page links corresponding to web pages of the website visited by the reader, and further allows the reader to select a particular link on the list to return to the corresponding web page.

8. The system of claim 1, wherein the relationship between the web pages is depicted as links on the website.

9. A system for developing a website, comprising at least one computer device that performs a method, comprising:

enabling a developer of the website to provide content for web pages of the website;

enabling the developer to define categories for the web pages based on location within the website, each category being defined based on a type of subject matter of information in the content, and for assigning creator groups thereto, wherein the content for the categories can be defined only by the assigned creator groups;

enabling the developer to dynamically define and depict a hierarchical relationship between the web pages;

enabling the developer to specify whether breadcrumb code is inserted into the web pages; and enabling the developer to define a feedback mechanism for receiving and tracking feedback related to the website from a user, wherein the creator groups include creators chosen from the group consisting of: authors who prepare the content for posting to the website, editors who edit the content submitted by the authors and administrators who approve the content, wherein the content, the relationship, the breadcrumb code, and the feedback mechanism of the website are adapted to be developed by a developer that has no knowledge of web-based programming and has no knowledge of Hypertext Markup Language (HTML).

10. The system of claim 9, wherein the content is defined in a non-HTML format and is converted to an HTML format.

11. The system of claim 10, the method further comprising loading the web pages onto a web server.

12. The system of claim 9, the method further comprising:

enabling the developer to define a calendar within the website;

tracking changes to the content; and tracking access to the web pages.

13. The system of claim 12, the method further comprising:

subscribing to the website and for generating an alert to subscribers when new content is posted on the website;

generating a reminder to update the content; and generating a list of new content that is posted to the website.

14. The system of claim 13, the method further comprising:

defining a side bar of information;

defining links within the content;

generating a list of current content and corresponding links, based on at least one predetermined criterion; and defining a template for the web pages.

15. The system of claim 14, the method further comprising:

defining roles of creators of the website;

defining a promotion schedule for content to be posted on the web pages; and defining whether the content is hidden, archived or deleted.

16. A method for developing a website, comprising the steps of:

defining categories for web pages of the web site based on location within the website, each category being defined based on a type of subject matter of information in the content;

assigning a creator group to each of the categories;

providing content in a non-HTML format, and arranging the provided content into the categories;

defining and depicting a hierarchical relationship between the web pages;

specifying whether breadcrumb code is inserted into the web pages; and defining a feedback mechanism for receiving and tracking feedback related to the website from a user, wherein the creator groups include creators chosen from the group consisting of: authors who prepare the content for posting to the website, editors who edit the content submitted by the authors and administrators who approve the content, wherein the content, defining of the relationship, specifying of the breadcrumb code, and the defining of the feedback mechanism of the website are adapted to be performed by a creator that has no knowledge of web-based programming and has no knowledge of Hypertext Markup Language (HTML).

17. The method of claim 16, further comprising the steps of:

converting the content into an HTML format; and loading the web pages onto a web server.

18. The method of claim 16, further comprising the steps of:

defining a calendar within the website that a user can use to keep track of calendaring information;

tracking changes to the content; and tracking access to the web pages.

19. The method of claim 16, further comprising the steps of:

receiving subscriptions to the website and generating an alert to subscribers when new content is posted on the website;

generating a reminder to update the content; and generating a list of new content that is posted to the website.

20. The method of claim 16, further comprising the steps of:

defining a side bar of information;

defining links within the content;

generating a list of current content and corresponding links, based on at least one predetermined criterion; and defining a template for the web pages.

21. The method of claim 16, further comprising:

defining roles of creators of the website;

defining a promotion schedule for the content to be posted on the web pages; and defining whether the content is hidden, deleted or archived.

22. A program product stored on a recordable storage device for developing a website, which when executed performs a method, comprising:

enabling a developer of the website to provide content for web pages of the website, wherein the web pages have defined categories based on location within the website into which the content is arranged, each category being defined based on a type of subject matter of information in the content;

enabling the developer to define and depict a hierarchical relationship between the web pages;

enabling the developer to specify whether breadcrumb code is inserted into the web pages;

inserting breadcrumb code into the web pages; and allowing the developer to define a feedback mechanism for receiving and tracking feedback related to the website from the user, wherein the content, the relationship, the breadcrumb code, and the feedback mechanism of the website are adapted to be developed by a creator that has no knowledge of web-based programming and has no knowledge of Hypertext Markup Language (HTML).

23. The program product of claim 22, the method further comprising:

defining the categories and assigning creator groups thereto, wherein the content for the categories can be defined only by the assigned creator groups;

tracking changes to the content; and tracking access to the web pages, wherein the creator groups include creators chosen from the group consisting of: authors who prepare the content for posting to the website, editors who edit the content submitted by the authors and administrators who approve the content.

24. The program product of claim 22, the method further comprising:

subscribing to the website and for generating an alert to subscribers when new content is posted on the website;

generating a reminder to update the content; and generating a list of new content that is posted to the website.

25. The program product of claim 22, the method further comprising:

defining a side bar of information;

defining links within the content;

generating a list of current content and corresponding links, based on at least one predetermined criterion; and defining a template for the web pages.

26. The program product of claim 22, the method further comprising:

defining roles of creators of the website;

defining a promotion schedule for content to be posted on the web pages; and defining whether the content is hidden, deleted or archived.

27. The program product of claim 22, the method further comprising converting the content from a non-HTML format into an HTML format and for loading the web pages onto a web server.

28. The program product of claim 22, wherein the breadcrumb code allows a reader of the website to view a list of web page links corresponding to web pages of the website visited by the reader, and further allows the reader to select a particular link on the list to return to the corresponding web page.

29. A system for developing a website, comprising at least one computer device that performs a method, comprising:

enabling a creator of the website to establish and update via a graphical user interface a plurality of categories for web pages in the website based on location within the website, each category being based on a type of subject matter of information in the content stored on the website, and for assigning creator groups to each category, wherein the generation of content is controlled to allow only the creator groups assigned to a particular category to create and update content for the particular category, the plurality of categories including a sports news category, a business news category, a local news category and a national news category;

allowing the creator to insert breadcrumb code into the website, the breadcrumb code for dynamically defining and depicting a site diagram, the site diagram being a hierarchical relationship between the web pages in the web site, through link documents that point to a web page in the hierarchy to allow a reader to see all visited web pages and to return to a particular page by selecting a corresponding link;

keeping track of changes to the website made by creators in the creator groups;

allowing creators to define a calendar for posting on the website that a user uses to keep track of calendaring information;

tracking access statistics regarding the website;

allowing creators to define feedback code for receiving, tracking and handling feedback for the website from the user;

wherein creators can develop the categories, the content, the creator groups, the breadcrumb code, the hierarchical relationship, the calendar and the feedback code of the website completely free of the need for hypertext markup language (HTML) and other web-based programming skill, and wherein creator groups include authors who prepare the content for posting to the website, editors who edit the content submitted by the authors and administrators who approve the content.

* * * * *